(12) United States Patent
Shen

(10) Patent No.: US 10,986,618 B2
(45) Date of Patent: Apr. 20, 2021

(54) CHANNEL RESOURCE SET INDICATION METHOD AND DEVICE, AND COMPUTER STORAGE MEDIUM

(71) Applicant: GUANGDONG OPPO MOBILE TELECOMMUNICATIONS CORP., LTD., Guangdong (CN)

(72) Inventor: Jia Shen, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/716,259

(22) Filed: Dec. 16, 2019

(65) Prior Publication Data

US 2020/0120652 A1 Apr. 16, 2020

Related U.S. Application Data

(63) Continuation of application No. PCT/CN2017/116497, filed on Dec. 15, 2017.

(51) Int. Cl.
*H04W 72/04* (2009.01)
*H04W 76/27* (2018.01)
*H04W 80/02* (2009.01)

(52) U.S. Cl.
CPC ... *H04W 72/0413* (2013.01); *H04W 72/0446* (2013.01); *H04W 72/0453* (2013.01);
(Continued)

(58) Field of Classification Search
CPC ......... H04W 72/0413; H04W 72/0446; H04W 72/0453; H04W 72/0466; H04W 72/042; H04W 72/1289
See application file for complete search history.

(56) References Cited

U.S. PATENT DOCUMENTS 9,521,664 B2 12/2016 Chen et al.
2018/0270791 A1* 9/2018 Park ..................... H04W 68/04
(Continued)

FOREIGN PATENT DOCUMENTS

CN 102823313 A 12/2012
CN 103220102 A 7/2013
(Continued)

OTHER PUBLICATIONS

European Search Report dated Jun. 25, 2020 from Application No. 17934741.4-1212.
(Continued)

*Primary Examiner* — Robert C Scheibel

(57) ABSTRACT

A channel resource set indication method, a device and a computer storage medium are provided. The method includes: a terminal determines at least two resource sets, wherein different resource sets respectively correspond to different configuration information, and the configuration information includes at least one of: a DCI format type, an uplink and downlink resource proportion, and a type of a downlink control channel search space; the terminal determines first configuration information; the terminal determines a first resource set corresponding to the first configuration information from the at least two resource sets; the terminal determines a target resource in the first resource set; and the terminal transmits a signaling or data corresponding to the first configuration information on the target resource.

18 Claims, 4 Drawing Sheets

(52) U.S. Cl.
CPC ....... *H04W 72/0466* (2013.01); *H04W 76/27* (2018.02); *H04W 80/02* (2013.01); *H04W 72/042* (2013.01)

(56) References Cited

U.S. PATENT DOCUMENTS

| | | | |
|---|---|---|---|
| 2018/0270799 A1* | 9/2018 | Noh | H04L 27/261 |
| 2018/0288747 A1* | 10/2018 | Sun | H04B 7/18582 |
| 2019/0053318 A1* | 2/2019 | Nogami | H04L 5/0044 |
| 2019/0082448 A1* | 3/2019 | Nogami | H04W 72/1289 |
| 2019/0132861 A1* | 5/2019 | Koorapaty | H04L 1/1819 |
| 2019/0149380 A1* | 5/2019 | Babaei | H04L 5/001 370/330 |
| 2019/0150183 A1* | 5/2019 | Aiba | H04W 24/10 370/336 |
| 2020/0015176 A1* | 1/2020 | Li | H04L 1/1819 |

FOREIGN PATENT DOCUMENTS

| | | |
|---|---|---|
| CN | 103430617 A | 12/2013 |
| CN | 104756435 A | 7/2015 |
| CN | 106160978 A | 11/2016 |
| CN | 106413097 A | 2/2017 |
| RU | 2583376 C2 | 5/2016 |
| RU | 2602808 C1 | 11/2016 |
| WO | 2014008661 A1 | 1/2014 |
| WO | 2014019194 A1 | 2/2014 |

OTHER PUBLICATIONS

European Search Report dated Jul. 17, 2020 from Application No. 18889234.3-1205.
3GPP TSG RAN WG1 Meeting #91; R1-1719928; Reno, USA, Nov. 27-Dec. 1, 2017.
3GPP TSG RAN WG1 Meeting 91; R1-1720333; Reno, USA, Nov. 27-Dec. 1, 2017.
3GPP TSG RAN WG1 Meeting #91; R1-1720603; Reno, USA, Nov. 27-Dec. 1, 2017.
3GPP TSG RAN WG1 Meeting 91; R1-1720878; Reno, USA, Nov. 27-Dec. 1, 2017.
3GPP TSG RAN WG1 Meeting #91; R1-1720926; Reno, USA, Meeting Nov. 27-Dec. 1, 2017.
3GPP TSG RAN WG1 Meeting RAN#91; R1-1721006; Reno, Nevada, United States, Nov. 27-Dec. 1, 2017.
3GPP TSG RAN WG1 Meeting 91; R1-1721504; Reno, USA, Nov. 27- Dec. 1, 2017.
3GPP TSG RAN WG1 Meeting 91; R1-1721685; Reno, USA, Nov. 27-Dec. 1, 2017.
International search report issued in corresponding international application No. PCT/CN2018/114418 dated Jan. 29, 2019.
Russia Office Action with English Translation for RU Application 2020100240/07(000355) dated Dec. 4, 2020.
India First Examination Report for IN Application 201917052246 dated Feb. 16, 2021.

\* cited by examiner

201 — A network device configures at least two resource sets for a terminal, wherein, different resource sets are respectively configured according to different configuration information, and the configuration information includes at least one of: a DCI format type, an uplink and downlink resource proportion, and a search space type of a downlink control channel 202 — The network device indicates the terminal to select a target resource from one of the at least two resource sets

FIG. 2

Channel Resource Set Indication Device

First Determining Unit 301

Second Determining Unit 302

First Selection Unit 303

Second Selection Unit 304

Transmission Unit 305

FIG. 3

CHANNEL RESOURCE SET INDICATION METHOD AND DEVICE, AND COMPUTER STORAGE MEDIUM

CROSS-REFERENCE TO RELATED APPLICATION(S)

This application is a continuation application of International Application No. PCT/CN2017/116497, filed on Dec. 15, 2017, the entire content of which is incorporated herein by reference.

TECHNICAL FIELD

The present disclosure relates to the technical field of wireless communication, in particular to a channel resource set indication method, device and a computer storage medium.

BACKGROUND

In a Long Term Evolution (LTE) system, a time-frequency resource of a physical channel (such as Physical Downlink Shared Channel (PDSCH) and Physical Uplink Shared Channel (PUSCH)) is indicated by Downlink Control Information (DCI). A scheduling granularity in time domain is a time slot or a subframe, and a scheduling bandwidth in frequency domain is a bandwidth of a whole system.

The fifth Generation mobile communication (5G) system supports more flexible scheduling, and scheduling at slot and symbol levels is supported in the time domain. A resource can be scheduled in a bandwidth part (BWP) smaller than a system bandwidth in frequency domain, and a control channel (such as Physical Uplink Control Channel (PUCCH)) can also be flexibly allocated with a resource in code domain. In the 5G system, if only direct DCI is used to indicate a resource, it will bring a lot of signaling overhead. Therefore, in the 5G system, a resource allocation method in which Radio Resource Control (RRC) configuration is widely used in conjunction with the DCI indication, that is, an RRC signaling is used to configure several "candidate resources", and then a specific resource is specified from this resource set through the DCI.

In existing 5G solutions, the DCI has only 2 to 4 bits used for indicating a resource in a resource set, i.e., one resource set contains only 4 to 16 candidate resources, while each type of physical channels can be only configured with one resource set. However, a resource to be scheduled includes parameters of many dimensions, including a starting time slot, a quantity of time slots, a starting symbol, a quantity of symbols, a starting Physical Resource Block (PRB), a quantity of PRBs, a code domain parameter (such as a sequence number, a cyclic shift number, an orthogonal mask number) and a frequency hopping parameter (such as whether frequency hopping is started or not, a location of the frequency domain for frequency hopping). It can be seen that one resource set including a small quantity of candidate resources cannot meet the flexible scheduling requirement, greatly limits scheduling flexibility of a system, and results in decrease of spectrum efficiency.

SUMMARY

In order to solve the above-mentioned technical problem, implementations of the present disclosure provide a channel resource set indication method, device and a computer storage medium.

An implementation of the present disclosure provides a channel resource set indication method, including: determining, by a terminal, at least two resource sets, wherein different resource sets respectively correspond to different configuration information, and the configuration information includes at least one of: a DCI format type, an uplink and downlink resource proportion, and a type of a downlink control channel search space; determining, by the terminal, first configuration information; determining, by the terminal, a first resource set corresponding to the first configuration information from the at least two resource sets; determining, by the terminal, a target resource in the first resource set; and transmitting, by the terminal, a signaling or data corresponding to the first configuration information on the target resource.

In an implementation of the present disclosure, determining, by the terminal, the at least two resource sets, includes: determining, by the terminal, configuration of the at least two resource sets based on preset information.

In an implementation of the present disclosure, determining, by the terminal, the at least two resource sets, includes: determining, by the terminal, configuration of the at least two resource sets according to a first message sent from a network device.

In an implementation of the present disclosure, the first message is a Radio Resource Control (RRC) control signaling or System Information (SI).

In an implementation of the present disclosure, determining, by the terminal, the first configuration information, includes: acquiring, by the terminal, the first configuration information according to a preset rule.

In an implementation of the present disclosure, determining, by the terminal, the first configuration information, includes: determining, by the terminal, the first configuration information according to a second message sent from a network device.

In an implementation of the present disclosure, the second message is a Radio Resource Control (RRC) control signaling, or SI, or DCI, or a Media Access Control (MAC) Control Element (CE).

In an implementation of the present disclosure, determining, by the terminal, the target resource in the first resource set, includes: determining, by the terminal, the target resource in the first resource set according to a third message sent a network device, wherein the third message includes numbering information of the target resource in the first resource set.

In an implementation of the present disclosure, the third message is DCI and/or MAC CE.

In an implementation of the present disclosure, that the different resource sets respectively correspond to the different configuration information includes: the different resource sets respectively correspond to different DCI format types; or, the different resource sets respectively correspond to different uplink and downlink resource proportions; or, the different resource sets respectively correspond to different types of downlink control channel search spaces.

In an implementation of the present disclosure, that the different resource sets respectively correspond to the different configuration information includes: the different resource sets respectively correspond to different DCI format types and different uplink and downlink resource proportions; or, the different resource sets respectively correspond to different DCI format types and different types of downlink control channel search spaces; or, the different resource sets respectively correspond to different uplink and downlink resource proportions and different types of downlink control channel search spaces.

In an implementation of the present disclosure, that the different resource sets respectively correspond to the different configuration information includes: the different resource sets respectively correspond to different DCI format types, different uplink and downlink resource proportions and different types of downlink control channel search spaces.

In an implementation of the present disclosure, each resource set includes at least one time domain resource, and/or frequency domain resource, and/or code domain resource.

An implementation of the present disclosure provides a channel resource set indication method, including: configuring, by a network device, at least two resource sets for a terminal, wherein different resource sets are respectively configured according to different configuration information, and the configuration information includes at least one of: a DCI format type, an uplink and downlink resource proportion, and a type of a downlink control channel search space; and indicating, by the network device, the terminal to select a target resource from one of the at least two resource sets.

In an implementation of the present disclosure, configuring, by the network device, the at least two resource sets for the terminal, includes: sending, by the network device, a first message to the terminal to configure configuration of the at least two resource sets.

In an implementation of the present disclosure, the first message is a Radio Resource Control (RRC) control signaling, or System Information (SI).

In an implementation, the method further includes: sending, by the network device, a second message to the terminal for determining a first resource set from the at least two resource sets through the second message.

In an implementation of the present disclosure, the second message is a Radio Resource Control (RRC) control signaling, or System Information (SI), or Downlink Control Information (DCI), or a Media Access Control (MAC) Control Element (CE).

In an implementation, the method further includes: sending, by the network device, a third message to the terminal for determining a target resource from the first resource set through the third message, wherein the third message includes numbering information of the target resource in the first resource set.

In an implementation of the present disclosure, the third message is DCI and/or an MAC CE.

In an implementation of the present disclosure, that the different resource sets are respectively configured according to the different configuration information includes: the different resource sets are configured according to different DCI format types; or, the different resource sets are configured according to different uplink and downlink resource proportions; or, the different resource sets are configured according to different types of downlink control channel search spaces.

In an implementation of the present disclosure, that the different resource sets are respectively configured according to the different configuration information includes: the different resource sets are configured according to different DCI format types and different uplink and downlink resource proportions; or, the different resource sets are configured according to different DCI format types and different types of downlink control channel search spaces; or, the different resource sets are configured according to different uplink and downlink resource proportions and different types of downlink control channel search spaces.

In an implementation of the present disclosure, that the different resource sets are respectively configured according to the different configuration information includes: the different resource sets are configured according to different DCI format types, different uplink and downlink resource proportions, and different types of downlink control channel search spaces.

An implementation of the present disclosure provides a channel resource set indication device, including a first determining unit, a second determining unit, a first selection unit, and a transmission unit.

The first determining unit is configured to determine at least two resource sets, wherein different resource sets respectively correspond to different configuration information, and the configuration information includes at least one of: a DCI format type, an uplink and downlink resource proportion, and a type of a downlink control channel search space.

The second determining unit is configured to determine first configuration information.

The first selection unit is configured to determine a first resource set corresponding to the first configuration information from the at least two resource sets.

The second selection unit is configured to determine a target resource in the first resource set.

The transmission unit is configured to transmit a signaling or data corresponding to the first configuration information on the target resource.

In an implementation of the present disclosure, the first determining unit is configured to determine configuration of the at least two resource sets based on preset information.

In an implementation of the present disclosure, the first determining unit is configured to determine configuration of the at least two resource sets according to a first message sent from a network device.

In an implementation of the present disclosure, the first message is a Radio Resource Control (RRC) control signaling, or System Information (SI).

In an implementation of the present disclosure, the second determining unit is configured to acquire the first configuration information according to a preset rule.

In an implementation of the present disclosure, the second determining unit is configured to determine the first configuration information according to a second message sent from a network device.

In an implementation of the present disclosure, the second message is a Radio Resource Control (RRC) control signaling, or System Information (SI), or Downlink Control Information (DCI), or a Media Access Control (MAC) Control Element (CE).

In an implementation of the present disclosure, the second selection unit is configured to determine a target resource in the first resource set according to a third message sent from a network device, wherein the third message includes numbering information of the target resource in the first resource set.

In an implementation of the present disclosure, the third message is DCI and/or MAC CE.

In an implementation of the present disclosure, that the different resource sets respectively correspond to the different configuration information includes: the different resource sets respectively correspond to different DCI format types; or, the different resource sets respectively correspond to different uplink and downlink resource proportions;

or, the different resource sets respectively correspond to different types of downlink control channel search spaces.

In an implementation of the present disclosure, that the different resource sets respectively correspond to the different configuration information includes: the different resource sets respectively correspond to different DCI format types and different uplink and downlink resource proportions; or, the different resource sets respectively correspond to different DCI format types and different types of downlink control channel search spaces; or, the different resource sets respectively correspond to different uplink and downlink resource proportions and different types of downlink control channel search spaces.

In an implementation of the present disclosure, that the different resource sets respectively correspond to the different configuration information includes: the different resource sets respectively correspond to different DCI format types, different uplink and downlink resource proportions and different types of downlink control channel search spaces.

In an implementation of the present disclosure, each resource set includes at least one time domain resource, and/or frequency domain resource, and/or code domain resource.

An implementation of the present disclosure provides a channel resource set indication device, including: a configuration unit and an indication unit.

The configuration unit is configured to configure at least two resource sets for a terminal, wherein, different resource sets are respectively configured according to different configuration information, and the configuration information includes at least one of: a DCI format type, an uplink and downlink resource proportion, and a type of a downlink control channel search space.

The indication unit is configured to indicate the terminal to select a target resource from one of the at least two resource sets.

In an implementation of the present disclosure, the configuration unit is configured to send a first message to the terminal to configure configuration of the at least two resource sets.

In an implementation of the present disclosure, the first message is a Radio Resource Control (RRC) control signaling, or System Information (SI).

In an implementation of the present disclosure, the indication unit is configured to send a second message to the terminal for determining a first resource set from the at least two resource sets through the second message.

In an implementation of the present disclosure, the second message is a Radio Resource Control (RRC) control signaling, or System Information (SI), or Downlink Control Information (DCI), or a Media Access Control (MAC) Control Element (CE).

In an implementation of the present disclosure, the indication unit is configured to send a third message to the terminal for determining a target resource from the first resource set through the third message, wherein the third message includes numbering information of the target resource in the first resource set.

In an implementation of the present disclosure, the third message is DCI and/or MAC CE.

In an implementation of the present disclosure, that the different resource sets are respectively configured according to the different configuration information includes: the different resource sets are configured according to different DCI format types; or, the different resource sets are configured according to different uplink and downlink resource proportions; or, the different resource sets are configured according to different types of downlink control channel search spaces.

In an implementation of the present disclosure, that the different resource sets are respectively configured according to the different configuration information includes: the different resource sets are configured according to different DCI format types and different uplink and downlink resource proportions; or, the different resource sets are configured according to different DCI format types and different types of downlink control channel search spaces; or, the different resource sets are configured according to different uplink and downlink resource proportions and different types of downlink control channel search spaces.

In an implementation of the present disclosure, that the different resource sets are respectively configured according to the different configuration information includes: the different resource sets are configured according to different DCI format types, different uplink and downlink resource proportions, and different types of downlink control channel search spaces.

An implementation provides a computer storage medium storing computer-executable instructions, and when the computer-executable instructions are executed by a processor, the processor implements the above channel resource set indication method.

BRIEF DESCRIPTION OF DRAWINGS

Drawings described herein are used for providing a further understanding of the present disclosure, and forming a part of the present application. The illustrative implementations of the present disclosure and the description thereof are used for explaining the present disclosure, but are not intended to constitute unsuitable limit to the present disclosure.

FIG. 2 is flowchart two of a channel resource set indication method according to an implementation of the present disclosure.

FIG. 3 is schematic diagram one of structure of a channel resource set indication device according to an implementation of the present disclosure.

DETAILED DESCRIPTION

To understand features and technical contents of implementations of the present disclosure in more detail, the implementation of the implementations of the present disclosure will be described in detail below with reference to the drawings, which are used for reference only and are not intended to limit the implementations of the present disclosure.

Figure 1:
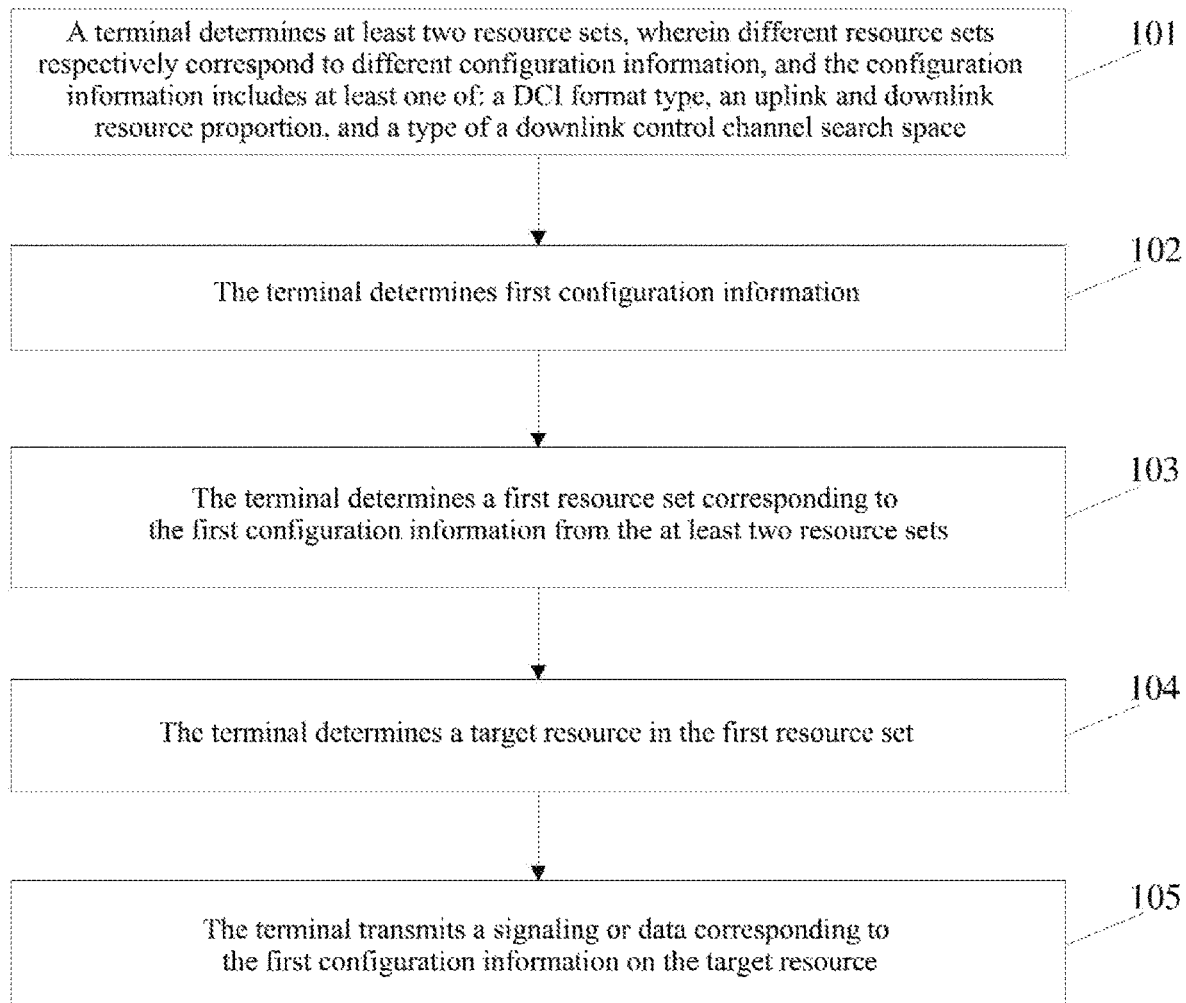
FIG. 1 is flowchart one of a channel resource set indication method according to an implementation of the present disclosure.

FIG. 1 is flowchart one of a channel resource set indication method according to an implementation of the present disclosure. As shown in FIG. 1, the method for indicating the channel resource set includes acts 101-105.

In act 101, a terminal determines at least two resource sets, wherein different resource sets respectively correspond to different configuration information, and the configuration information includes at least one of: a DCI format type, an uplink and downlink resource proportion, and a type of a downlink control channel search space.

Here, the terminal may be a device that can access to a communication network, such as a mobile phone, a tablet computer, or the like.

In an implementation of the present disclosure, each resource set includes at least one time domain resource, and/or frequency domain resource, and/or code domain resource.

In addition, it should be understood that the at least one time domain resource, and/or frequency domain resource, and/or code domain resource contained in different resource sets is at least partially different; or the at least one time domain resource, and/or frequency domain resource, and/or code domain resource contained in different resource sets is completely different.

In an implementation of the present disclosure, that the terminal determines at least two resource sets may be implemented by but not limited to following modes.

Mode one: the terminal determines configuration of the at least two resource sets based on preset information.

Here, preset information (which may also be referred to as predefined information) may be preset according to information acquired by another operation at the terminal side.

Mode two: the terminal determines configuration of the at least two resource sets according to a first message sent from a network device.

Here, the first message is an RRC control signaling, or SI.

In an implementation of the present disclosure, the configuration information includes at least one of: a DCI format type, an uplink and downlink resource proportion, and a type of a downlink control channel search space.

The uplink and downlink resource proportion includes at least one of: an uplink and downlink configuration ratio and a time slot format. It should be understood that the uplink and downlink resource proportion is used to describe a positional relationship between an uplink resource and a downlink resource, for example, which symbols in a time slot correspond to an uplink resource and which symbols in the time slot correspond to a downlink resource.

Types of downlink control channel search spaces include at least two types of: a common search space and a UE-specific search space.

In the 5G, a resource to be scheduled includes parameters of many dimensions, including a starting time slot, a quantity of time slots, a starting symbol, a quantity of symbols, a Physical Resource Block (PRB), a quantity of PRBs, a code domain parameter (such as a sequence number, a cyclic shift number, an orthogonal mask number) and a frequency hopping parameter (such as whether frequency hopping is started or not, a location of the frequency domain for frequency hopping). Therefore, different resource sets may be configured for different DCI format types; different resource sets may be configured for different uplink and downlink resource proportions; and different resource sets may be configured for different types of downlink control channel search spaces.

1) Taking configuration information including configuration of one dimension as an example, that the different resource sets respectively correspond to the different configuration information includes: the different resource sets respectively correspond to different DCI format types; or, the different resource sets respectively correspond to different uplink and downlink resource proportions; or, the different resource sets respectively correspond to different types of downlink control channel search spaces.

For example, DCI format 1 corresponds to resource set 1, and DCI format 2 corresponds to resource set 2.

For another example, uplink and downlink resource proportion 1 corresponds to resource set 1, and uplink and downlink resource proportion 2 corresponds to resource set 2.

For yet another example, a common search space corresponds to resource set 1 and a UE-specific search space corresponds to resource set 2.

2) Taking configuration information including configuration of two dimensions as an example, that the different resource sets respectively correspond to the different configuration information includes: the different resource sets respectively correspond to different DCI format types and different uplink and downlink resource proportions; or, the different resource sets respectively correspond to different DCI format types and different types of downlink control channel search spaces; or, the different resource sets respectively correspond to different uplink and downlink resource proportions and types of downlink control channel search spaces.

For example, DCI format 1 and uplink and downlink resource proportion 1 correspond to resource set 1, and DCI format 2 and uplink and downlink resource proportion 2 correspond to resource set 2.

For another example, DCI format 1 and a common search space correspond to resource set 1, and DCI format 2 and a UE-specific search space correspond to resource set 2.

For yet another example, uplink and downlink resource proportion 1 and the common search space correspond to resource set 1, and uplink and downlink resource proportion 2 and the UE-specific search space correspond to resource set 2.

3) Taking configuration information including configuration of three dimensions as an example, that the different resource sets respectively correspond to the different configuration information includes: the different resource sets respectively correspond to different DCI format types, different uplink and downlink resource proportions and different types of downlink control channel search spaces.

For example, DCI format 1, uplink and downlink resource proportion 1 and a common search space correspond to resource set 1, and DCI format 2, uplink and downlink resource proportion 2 and a UE-specific search space correspond to resource set 2.

In act 102, the terminal determines first configuration information.

In an implementation of the present disclosure, the terminal may determine the first configuration information by, but not limited to, following modes.

Mode one: the terminal acquires the first configuration information according to a preset rule.

Here, the terminal performs certain operations (such as detecting certain information or a certain signal) according to the preset rule to obtain the first configuration information.

Mode two: the terminal determines the first configuration information according to a second message sent from a network device.

The second message is an RRC control signaling, or SI, or DCI, or MAC CE.

In act 103, the terminal determines a first resource set corresponding to the first configuration information from the at least two resource sets.

In act 104, the terminal determines a target resource in the first resource set.

Specifically, the terminal determines the target resource in the first resource set according to a third message sent from a network device.

The third message includes numbering information of the target resource in the first resource set.

Here, the third message is DCI and/or MAC CE.

For example, the third message is the DCI, and the DCI includes the numbering information. For another example, the third message is the DCI and the MAC CE, and the DCI and MAC CE jointly indicate the numbering information.

In act 105, the terminal transmits a signaling or data corresponding to the first configuration information on the target resource.

It should be understood that in the implementation of the present disclosure, that the terminal transmits data or a signaling on the target resource includes the terminal receives the data or signaling, i.e., the downlink data or signaling, sent by a network device on the target resource, and also includes the terminal sends the data or signaling, i.e., the uplink data or signaling, to the network device on the target resource.

FIG. 2 is flowchart two of a channel resource set indication method according to an implementation of the present disclosure. As shown in FIG. 2, the channel resource set indication method includes acts 201 and 202.

In act 201, a network device configures at least two resource sets for a terminal, wherein different resource sets are respectively configured according to different configuration information, and the configuration information includes at least one of: a DCI format type, an uplink and downlink resource proportion, and a type of a downlink control channel search space.

In an implementation of the present disclosure, each resource set includes at least one time domain resource, and/or frequency domain resource, and/or code domain resource.

In an implementation, the network device sends a first message to the terminal to configure configuration of the at least two resource sets.

The first message is an RRC control signaling, or SI.

In the 5G, a resource to be scheduled includes parameters of many dimensions, including a starting time slot, a quantity of time slots, a starting symbol, a quantity of symbols, a PRB, a quantity of PRBs, a code domain parameter (such as a sequence number, a cyclic shift number, an orthogonal mask number) and a frequency hopping parameter (such as whether frequency hopping is started or not, a location of the frequency domain for frequency hopping). Therefore, different resource sets may be configured for different DCI format types; different resource sets may be configured for different uplink and downlink resource proportions; and different resource sets may be configured for different types of downlink control channel search spaces.

1) Taking configuration information including configuration of one dimension as an example, that the different resource sets are respectively configured according to the different configuration information includes: the different resource sets are configured according to different DCI format types; or, the different resource sets are configured according to different uplink and downlink resource proportions; or, the different resource sets are configured according to different types of downlink control channel search spaces.

2) Taking configuration information including configuration of two dimensions as an example, that the different resource sets respectively correspond to the different configuration information includes: the different resource sets respectively correspond to different DCI format types and different uplink and downlink resource proportions; or, the different resource sets respectively correspond to different DCI format types and different types of downlink control channel search spaces; or, the different resource sets respectively correspond to different uplink and downlink resource proportions and different types of downlink control channel search spaces.

3) Taking configuration information including configuration of three dimensions as an example, that the different resource sets respectively correspond to the different configuration information includes: the different resource sets respectively correspond to different DCI format types, different uplink and downlink resource proportions and different types of downlink control channel search spaces.

In act 202, the network device indicates the terminal to select a target resource from one of the at least two resource sets.

Specifically, 1) the network device sends a second message to the terminal for determining a first resource set from the at least two resource sets through the second message. 2) the network device sends a third message to the terminal for determining a target resource from the first resource set through the third message; and the third message includes numbering information of the target resource in the first resource set.

For the above 1), the second message is an RRC control signaling, or SI, or DCI, or an MAC CE.

For the above 2), the third message is DCI and/or an MAC CE.

FIG. 3 is schematic diagram one of a structure of a channel resource set indication device according to an implementation of the present disclosure. As shown in FIG. 3, the channel resource set indication device includes a first determining unit 301, a second determining unit 302, a first selection unit 303, a second selection unit 304, and a transmission unit 305.

The first determining unit 301 is configured to determine at least two resource sets, wherein different resource sets respectively correspond to different configuration information, and the configuration information includes at least one of: a DCI format type, an uplink and downlink resource proportion, and a type of a downlink control channel search space.

The second determining unit 302 is configured to determine first configuration information.

The first selection unit 303 is configured to determine a first resource set corresponding to the first configuration information from the at least two resource sets.

The second selection unit 304 is configured to determine a target resource in the first resource set.

The transmission unit 305 is configured to transmit a signaling or data corresponding to the first configuration information on the target resource.

In an implementation, the first determining unit 301 is configured to determine configuration of the at least two resource sets based on preset information.

In an implementation, the first determining unit 301 is configured to determine configuration of the at least two resource sets according to a first message sent from a network device.

In an implementation, the first message is an RRC control signaling, or SI.

In an implementation, the second determining unit 302 is configured to acquire the first configuration information according to a preset rule.

In an implementation, the second determining unit 302 is configured to determine the first configuration information according to a second message sent from a network device.

In an implementation, the second message is an RRC control signaling, or SI, or DCI, or a Media Access Control (MAC) Control Element (CE).

In an implementation, the second selection unit 304 is configured to determine a target resource in the first resource set according to a third message sent from a network device.

The third message includes numbering information of the target resource in the first resource set.

In an implementation, the third message is DCI and/or an MAC CE.

In an implementation, that the different resource sets respectively correspond to the different configuration information includes: the different resource sets respectively correspond to different DCI format types; or, the different resource sets respectively correspond to different uplink and downlink resource proportions; or, the different resource sets respectively correspond to different types of downlink control channel search spaces.

In an implementation, that the different resource sets respectively correspond to the different configuration information includes: the different resource sets respectively correspond to different DCI format types and different uplink and downlink resource proportions; or, the different resource sets respectively correspond to different DCI format types and different types of downlink control channel search spaces; or, the different resource sets respectively correspond to different uplink and downlink resource proportions and different types of downlink control channel search spaces.

In an implementation, that the different resource sets respectively correspond to the different configuration information includes: the different resource sets respectively correspond to different DCI format types, different uplink and downlink resource proportions and different types of downlink control channel search spaces.

In an implementation, each resource set includes at least one time domain resource, and/or frequency domain resource, and/or code domain resource.

Those skilled in the art should understand that the implementation functions of each unit in the channel resource set indication device shown in FIG. 3 can be understood with reference to the related description of the above channel resource set indication method. The function of each unit in the channel resource set indication device shown in FIG. 3 can be implemented by a program running on a processor or a specific logic circuit.

Figure 4:
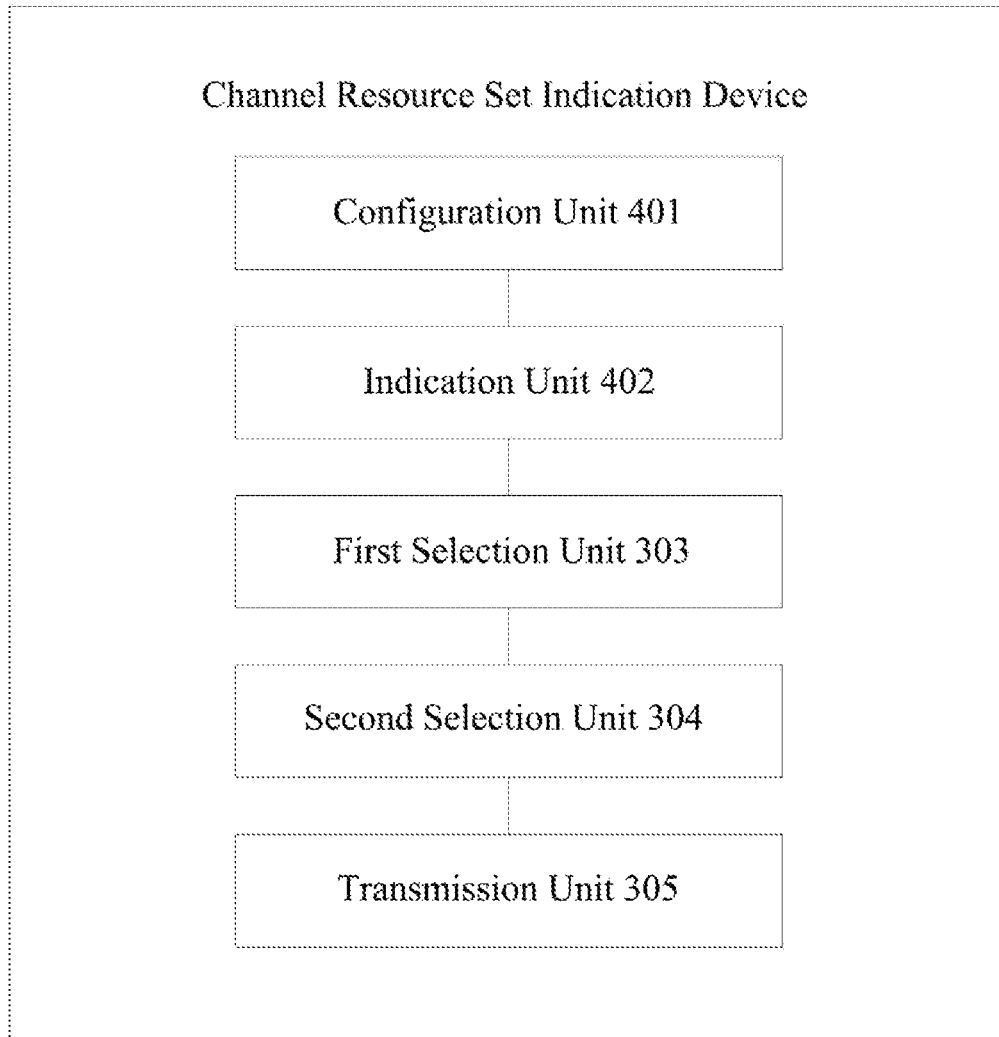
FIG. 4 is schematic diagram two of structure of a channel resource set indication device according to an implementation of the present disclosure.

FIG. 4 is schematic diagram two of structure of a channel resource set indication device according to an implementation of the present disclosure. As shown in FIG. 4, the channel resource set indication device includes a configuration unit 401 and an indication unit 402.

The configuration unit 401 is configured to configure at least two resource sets for a terminal, wherein, different resource sets are respectively configured according to different configuration information, and the configuration information includes at least one of: a DCI format type, an uplink and downlink resource proportion, and a type of a downlink control channel search space.

The indication unit 402 is configured to indicate the terminal to select a target resource from one of the at least two resource sets.

In an implementation, the configuration unit 401 is configured to send a first message to the terminal to configure configuration of the at least two resource sets.

In an implementation, the first message is an RRC control signaling, or SI.

In an implementation, the indication unit 402 is configured to send a second message to the terminal for determining a first resource set from the at least two resource sets through the second message.

In an implementation, the second message is an RRC control signaling, or SI, or DCI, or a MAC CE.

In an implementation, the indication unit 402 is configured to send a third message to the terminal for determining a target resource from the first resource set through the third message.

The third message includes numbering information of the target resource in the first resource set.

In an implementation, the third message is DCI and/or an MAC CE.

In an implementation, that the different resource sets are respectively configured according to the different configuration information includes: the different resource sets are configured according to different DCI format types; or, the different resource sets are configured according to different uplink and downlink resource proportions; or, the different resource sets are configured according to different types of downlink control channel search spaces.

In an implementation, that the different resource sets are respectively configured according to the different configuration information includes: the different resource sets are configured according to different DCI format types and uplink and different downlink resource proportions; or, the different resource sets are configured according to different DCI format types and different types of downlink control channel search spaces; or, the different resource sets are configured according to different uplink and downlink resource proportions and different types of downlink control channel search spaces.

In an implementation, that the different resource sets are respectively configured according to the different configuration information includes: the different resource sets are configured according to different DCI format types, different uplink and downlink resource proportions, and different types of downlink control channel search spaces.

Those skilled in the art should understand that the implementation functions of each unit in the channel resource set indication device shown in FIG. 4 can be understood with reference to the related description of the above channel resource set indication method. The function of each unit in the channel resource set indication method shown in FIG. 4 can be implemented by a program running on a processor or a specific logic circuit.

If the above channel resource set indication device in implementations of the present disclosure is implemented in a form of a software function module and sold or used as an independent product, it may also be stored in a computer readable storage medium. Based on this understanding, the technical solutions in the implementations of the present disclosure, in essence, or the part contributing to the prior art, may be embodied in the form of a software product stored in a storage medium, including several instructions for causing a computer device (which may be a personal computer, a server, or a network device, etc.) to perform all or part of the methods described in various implementations of the present disclosure. The aforementioned storage medium includes a U disk, a mobile hard disk, a read-only memory (ROM), a magnetic disk or an optical disk, and other media capable of storing program codes. Thus, the implementations of the present disclosure are not limited to any specific combination of hardware and software.

Correspondingly, an implementation of the present disclosure also provides a computer storage medium storing computer executable instructions, and when the computer executable instructions are executed by a processor, the computer executable instructions implement the channel resource set indication method in the implementations of the present disclosure.

Figure 5:
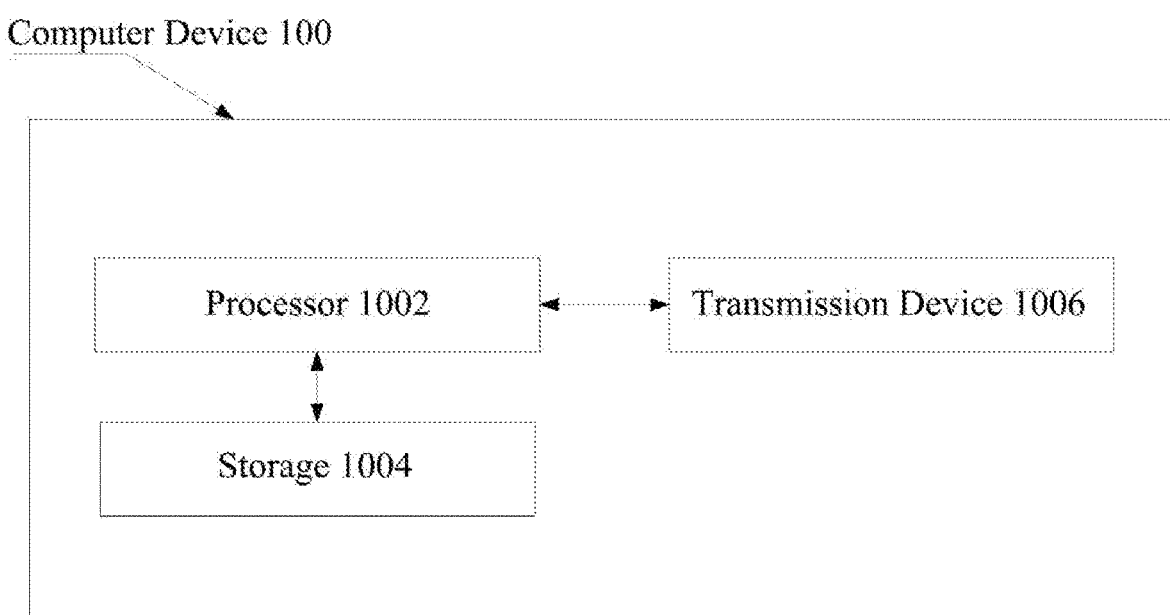
FIG. 5 is a schematic diagram of structure of a computer device according to an implementation of the present disclosure.

FIG. 5 is a schematic diagram of structure of a computer device according to an implementation of the present disclosure. The computer device may be a terminal or a network device. As shown in FIG. 5, the computer device 100 may include one or multiple (only one is shown in the figure) processors 1002 (the processor 1002 may include, but are not limited to, a processing device such as a microprocessor (Micro Controller Unit (MCU)) or Field Programmable Gate Array (FPGA), or the like, memories 1004 used for storing data, and transmission devices 1006 used for communication functions. One of ordinary skilled in the art should understand that the structure shown in FIG. 5 is only schematic and does not limit the structure of the above electronic device. For example, the computer device 100 may also include more or fewer components than those shown in FIG. 5, or have a different configuration than those shown in FIG. 5.

The storage 1004 may be used for storing software programs and modules of application software, such as program instructions/modules corresponding to a channel resource set indication method in the implementations of the present disclosure. The processor 1002 executes various functional applications and data processing by running the software programs and the modules stored in the storage 1004, i.e., implements the above method. The storage 1004 may include a high-speed random access memory and may also include a non-volatile memory such as one or more magnetic storage devices, flash memories, or other non-volatile solid-state memories. In some examples, the storage 1004 may further include a storage remotely disposed with respect to the processor 1002, wherein the remote storage may be connected to the computer device 100 through a network. Examples of the above network include, but are not limited to, the Internet, an intranet, a local area network, a mobile communication network, and combinations thereof.

The transmission device 1006 is used for receiving or sending data via a network. Specific examples of the network described above may include a wireless network provided by a communication provider of the computer device 100. In an example, the transmission device 1006 includes a Network Interface Controller (NIC), which may be connected with another network device through a base station so as to communicate with the Internet. In an example, the transmission device 1006 may be a Radio Frequency (RF) module, which is used for communicating with the Internet in a wireless way.

The technical solutions described in the implementations of the present disclosure can be combined arbitrarily without conflict.

In several implementations provided by the present disclosure, it should be understood that the disclosed method and smart device may be implemented in another way. The device implementations described above are only illustrative, for example, the division of the units is only a logical function division, and there may be other division ways in actual implementation. For example, multiple units or components may be combined or integrated into another system, or some features may be ignored or not executed. In addition, the mutual coupling or direct coupling or communication connection between various components shown or discussed may be indirect coupling or communication connection through some interface, device or unit, and may be electrical, mechanical or in other forms.

The unit described as a separate component may or may not be physically separated, and the component shown as a unit may or may not be a physical unit, i.e., it may be located in one place or may be distributed over multiple network units. Some or all of the units may be selected according to practical needs to achieve a purpose of the implementations.

In addition, various functional units in various implementations of the present disclosure may be all integrated in a second processing unit, or various units may be taken as one unit separately, or two or more units may be integrated in one unit. The above-mentioned integrated units may be implemented in a form of hardware or in a form of hardware and software functional units.

What are described above are merely example implementations of the present application, but the protection scope of the present application is not limited thereto. Any person skilled in the art may easily conceive variations or substitutions within the technical scope disclosed by the present application, which should be included within the protection scope of the present application.

What is claimed is:

1. A method for indicating channel resource set, comprising:
    determining, by a terminal device, at least two resource sets, wherein different resource sets respectively correspond to different configuration information, and the configuration information comprises one of: a Downlink Control Information (DCI) format type and a type of a downlink control channel search space, or an uplink and downlink resource proportion and a type of a downlink control channel search space;
    determining, by the terminal device, first configuration information;
    determining, by the terminal device, a first resource set corresponding to the first configuration information from the at least two resource sets; and
    determining, by the terminal device, a target resource in the first resource set according to a first message sent from a network device, wherein the first message comprises numbering information of the target resource in the first resource set, wherein the first message is at least one of Downlink Control Information (DCI) or a Media Access Control (MAC) Control Element (CE).

2. The method of claim 1, wherein determining, by the terminal device, the at least two resource sets, comprises:
    determining, by the terminal device, configuration of the at least two resource sets based on preset information.

3. The method of claim 1, wherein determining, by the terminal device, the at least two resource sets, comprises:
    determining, by the terminal device, configuration of the at least two resource sets according to a second message sent from a network device, wherein the second message is a Radio Resource Control (RRC) control signaling or System Information (SI).

4. The method of claim 1, wherein determining, by the terminal device, the first configuration information, comprises:
    acquiring, by the terminal device, the first configuration information according to a preset rule; or
    determining, by the terminal device, the first configuration information according to a third message sent from a network device, wherein the third message is a Radio Resource Control (RRC) control signaling, or System Information (SI), or Downlink Control Information (DCI), or a Media Access Control (MAC) Control Element (CE).

5. The method of claim 1, wherein that the different resource sets respectively correspond to the different configuration information comprises:
the different resource sets respectively correspond to different DCI format types; or,
the different resource sets respectively correspond to different uplink and downlink resource proportions; or,
the different resource sets respectively correspond to different types of downlink control channel search spaces.

6. The method of claim 1, wherein each resource set comprises at least one of: one time domain resource, frequency domain resource, or code domain resource.

7. A method for indicating channel resource set, comprising:
configuring, by a network device, at least two resource sets for a terminal, wherein different resource sets are respectively configured according to different configuration information, and the configuration information comprises one of: a Downlink Control Information (DCI) format type and a type of a downlink control channel search space, or an uplink and downlink resource proportion and a type of a downlink control channel search space;
indicating, by the network device, the terminal to select a target resource from a first resource set of the at least two resource sets; and
outputting, by the network device, a first message to the terminal for determining the target resource from the first resource set through the first message, wherein the first message comprises numbering information of the target resource in the first resource set, and the first message is at least one of Downlink Control Information (DCI) or a Media Access Control (MAC) Control Element (CE).

8. The method of claim 7, wherein configuring, by the network device, the at least two resource sets for the terminal, comprises:
sending, by the network device, a second message to the terminal to configure configuration of the at least two resource sets, wherein the second message is a Radio Resource Control (RRC) control signaling, or System Information (SI).

9. The method of claim 7, wherein that the different resource sets are respectively configured according to the different configuration information comprises:
the different resource sets are configured according to different DCI format types; or,
the different resource sets are configured according to different uplink and downlink resource proportions; or,
the different resource sets are configured according to different types of downlink control channel search spaces.

10. An apparatus in a communication device, comprising:
a processor and a storage storing program instructions;
wherein when the program instructions are executed by the processor, the apparatus is configured to:
determine at least two resource sets, wherein different resource sets respectively correspond to different configuration information, and the configuration information comprises one of: a Downlink Control Information (DCI) format type and a type of a downlink control channel search space, or an uplink and downlink resource proportion and a type of a downlink control channel search space;
determine first configuration information;
determine a first resource set corresponding to the first configuration information from the at least two resource sets; and
determine a target resource in the first resource set according to a first message sent from a network device, wherein the first message comprises numbering information of the target resource in the first resource set; wherein the first message is at least one of Downlink Control Information (DCI) or a Media Access Control (MAC) Control Element (CE).

11. The apparatus of claim 10, wherein when the program instructions are executed by the processor, the apparatus is configured to: determine configuration of the at least two resource sets based on preset information.

12. The apparatus of claim 10, wherein when the program instructions are executed by the processor, the apparatus is configured to: determine configuration of the at least two resource sets according to a second message sent from a network device, wherein the second message is a Radio Resource Control (RRC) control signaling, or System Information (SI).

13. The apparatus of claim 10, wherein when the program instructions are executed by the processor, the apparatus is configured to:
acquire the first configuration information according to a preset rule; or
determine the first configuration information according to a third message sent from a network device, wherein the third message is a Radio Resource Control (RRC) control signaling, or System Information (SI), or Downlink Control Information (DCI), or a Media Access Control (MAC) Control Element (CE).

14. The apparatus of claim 10, wherein that the different resource sets respectively correspond to the different configuration information comprises:
the different resource sets respectively correspond to different DCI format types; or,
the different resource sets respectively correspond to different uplink and downlink resource proportions; or,
the different resource sets respectively correspond to different types of downlink control channel search spaces.

15. The apparatus of claim 10, wherein each resource set comprises at least one of: one time domain resource, frequency domain resource, or code domain resource.

16. An apparatus in a communication device, comprising:
a processor and a storage storing program instructions;
wherein when the program instructions are executed by the processor, the apparatus is configured to:
configure at least two resource sets for a terminal, wherein, different resource sets are respectively configured according to different configuration information, and the configuration information comprises one of: a Downlink Control Information (DCI) format type and a type of a downlink control channel search space, or an uplink and downlink resource proportion and a type of a downlink control channel search space; and
indicate the terminal to select a target resource from a first resource set of the at least two resource sets; and
output a first message to the terminal for determining the target resource from the first resource set through the first message, wherein the first message comprises numbering information of the target resource in the first resource set, and the firsts message is at least one of: Downlink Control Information (DCI) or Media Access Control (MAC) Control Element (CE).

17. The apparatus of claim 16, wherein when the program instructions are executed by the processor, the apparatus is configured to: send a second message to the terminal to configure configuration of the at least two resource sets, wherein the second message is a Radio Resource Control (RRC) control signaling, or System Information (SI).

18. The apparatus of claim 16, wherein that the different resource sets are configured according to the different configuration information respectively comprises:
the different resource sets are configured according to different DCI format types; or,
the different resource sets are configured according to different uplink and downlink resource proportions; or,
the different resource sets are configured according to different types of downlink control channel search spaces.

* * * * *